(12) United States Patent
Leger et al.

(10) Patent No.: US 8,955,537 B2
(45) Date of Patent: Feb. 17, 2015

(54) STEM GUIDE APPARATUS FOR USE WITH FLUID VALVE ACTUATORS

(75) Inventors: Bryan Quinn Leger, Marshalltown, IA (US); Trenton Frank Jackson, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 417 days.

(21) Appl. No.: 12/857,313

(22) Filed: Aug. 16, 2010

(65) Prior Publication Data

US 2012/0037824 A1 Feb. 16, 2012

(51) Int. Cl.
- *F16K 31/126* (2006.01)
- *F01L 3/08* (2006.01)
- *F16C 29/02* (2006.01)
- *F16C 33/02* (2006.01)
- *F16K 31/165* (2006.01)
- *F15B 15/10* (2006.01)

(52) U.S. Cl.
CPC ............. *F16K 31/1655* (2013.01); *F15B 15/10* (2013.01)
USPC ............. 137/269; 251/58; 251/279; 251/337; 92/165 R; 384/29; 384/41

(58) Field of Classification Search
CPC ..... F02M 25/0778; F15B 15/10; F15B 15/06; F15B 15/1414
USPC ......... 251/58, 59, 91, 92, 228, 279, 235, 337; 92/165 R, 168; 384/7, 26, 29, 41, 32; 137/269, 271
See application file for complete search history.

(56) References Cited

U.S. PATENT DOCUMENTS

| 3,082,792 | A | * | 3/1963 | Jenkins | 92/94 |
| 3,613,719 | A | * | 10/1971 | Bauer | 137/492 |
| 3,665,953 | A | * | 5/1972 | Chronister | 137/246.22 |
| 3,876,179 | A | * | 4/1975 | Baumann | 251/298 |
| 3,884,446 | A | * | 5/1975 | Erickson | 251/61.4 |

(Continued)

FOREIGN PATENT DOCUMENTS

| DE | 2211955 | 9/1973 |
| JP | 58106205 | 6/1983 |

(Continued)

OTHER PUBLICATIONS

Emerson Process Management, "2052 Diaphragm Rotary Actuator," Instruction Manual, published Apr. 2009, 16 pages.

(Continued)

*Primary Examiner* — Stephen M Hepperle
*Assistant Examiner* — Seth W Mackay-Smith
(74) *Attorney, Agent, or Firm* — Hanley, Flight & Zimmerman, LLC

(57) ABSTRACT

Actuator stem guide apparatus for use with fluid valve actuators are described. An example actuator stem guide apparatus includes a base having an opening to allow an actuator stem of the fluid valve actuator to tilt or lean within the base to enable a lever of the fluid valve actuator to rotate and a guide receiving area adjacent the opening of the base. A guide is coupled to the guide receiving area and the guide has a bearing surface to slidably engage the actuator stem to limit lateral movement of a diaphragm assembly relative to a longitudinal axis of the opening to prevent the diaphragm assembly from engaging an inner surface of an actuator housing as the actuator stem moves between a first position and a second position.

28 Claims, 9 Drawing Sheets

(56) References Cited

U.S. PATENT DOCUMENTS

| | | | | |
|---|---|---|---|---|
| 4,062,375 | A * | 12/1977 | Byrnes | 137/296 |
| 4,064,906 | A * | 12/1977 | Berg | 137/529 |
| 4,234,010 | A * | 11/1980 | Jenkins et al. | 137/242 |
| 4,234,157 | A * | 11/1980 | Hodgeman et al. | 251/56 |
| 4,238,991 | A * | 12/1980 | Pickles | 92/85 A |
| 4,325,647 | A * | 4/1982 | Maier et al. | 403/29 |
| 4,403,538 | A * | 9/1983 | Rise | 92/94 |
| 4,549,470 | A * | 10/1985 | Yogo | 92/94 |
| 4,575,262 | A * | 3/1986 | Andersen | 374/147 |
| 4,696,320 | A * | 9/1987 | Bull | 137/116.5 |
| 5,148,678 | A * | 9/1992 | Ueda et al. | 60/602 |
| 5,172,552 | A * | 12/1992 | Elpern et al. | 60/602 |
| 5,671,878 | A * | 9/1997 | Kawasaki | 226/196.1 |
| 5,727,447 | A * | 3/1998 | Shiraishi et al. | 92/164 |
| 6,662,708 | B2 * | 12/2003 | Hosny | 92/98 R |
| 7,423,421 | B2 * | 9/2008 | Reichert et al. | 324/207.24 |
| 7,823,385 | B2 * | 11/2010 | McEwen et al. | 60/602 |
| 2003/0015089 | A1 | 1/2003 | Takahashi et al. | |
| 2004/0061084 | A1 * | 4/2004 | Baumann | 251/58 |
| 2005/0061144 | A1 * | 3/2005 | Schall | 92/98 D |
| 2006/0130911 | A1 * | 6/2006 | Caprera | 137/614.11 |
| 2006/0208724 | A1 * | 9/2006 | Reichert et al. | 324/207.2 |
| 2009/0294427 | A1 * | 12/2009 | Matthews et al. | 219/136 |

FOREIGN PATENT DOCUMENTS

| | | |
|---|---|---|
| JP | 03050327 | 3/1991 |
| JP | 2009243686 | 10/2009 |

OTHER PUBLICATIONS

Emerson Process Management, "2052 Diaphragm Rotary Actuator," Product Bulletin, published Aug. 2011, 12 pages.

International Searching Authority, "International Search Report," issued in connection with international application serial No. PCT/US2011/044007, mailed Nov. 4, 2011, 3 pages.

International Searching Authority, "Written Opinion of the International Searching Authority," issued in connection with international application serial No. PCT/US2011/044007, mailed Nov. 4, 2011, 6 pages.

The State Intellectual Property Office of the People'S Republic of China, "First Office Action," issued in connection with Chinese Patent Application No. 201180001588.7, mailed on Apr. 10, 2014, 22 pages.

The State Intellectual Property Office of the People'S Republic of China, "Second Office Action," issued in connection with Chinese Patent Application No. 201180001588.7, mailed on Nov. 13, 2014, 7 pages.

* cited by examiner

STEM GUIDE APPARATUS FOR USE WITH FLUID VALVE ACTUATORS

FIELD OF THE DISCLOSURE

This disclosure relates generally to fluid valve actuators and, more particularly, to stem guide apparatus for use with fluid valve actuators.

BACKGROUND

Automated control valves such as, for example, rotary control valves, are often used in process control plants or systems to control the flow of process fluids. A rotary control valve typically includes an actuator (e.g., a pneumatic actuator, an electric actuator, a hydraulic actuator, etc.) operatively coupled to a valve shaft extending from the rotary valve via a lever. The lever converts a rectilinear displacement of an actuator stem into a rotational displacement of the valve shaft. Thus, rotation of the lever causes the valve shaft and a flow control member (e.g., a disk, a ball, etc.) coupled to the valve shaft to rotate relative to a valve seat to allow fluid flow through the valve (e.g., an open position) or restrict fluid flow through the valve (e.g., a closed position). In operation, the actuator stem can move or tilt laterally relative to a longitudinal axis of the actuator housing to enable the lever to rotate. In the closed position, the actuator stem imparts a torque to the flow control member via the lever so that the flow control member sealingly engages the valve seat to prevent fluid flow through the valve.

A rotary valve often employs a diaphragm and spring actuator. The diaphragm moves between a first position at which the springs are in an initial or preloaded compressed state (e.g., when the valve is in an open position) and a second position at which the springs are in a fully compressed state (e.g., when the valve is in a closed position). The actuator is configured to allow the springs to translate or shift within a housing of the actuator due to inherent side load forces generated by the springs when the springs are in the compressed state and/or due to the actuator stem moving or tilting relative to the longitudinal axis when the rotating the lever. However, such movement or shifting of the springs may cause a diaphragm plate to engage an inner surface of the actuator housing, which creates friction and/or can crimp, deform or otherwise damage the diaphragm and reduce the effective diaphragm area. Reducing an effective diaphragm area of the diaphragm can reduce the net amount of torque provided by the actuator to the flow control member when the flow control member engages the valve seat, thereby reducing the performance of the fluid control valve.

SUMMARY

In one example, an actuator stem guide includes a base having an opening to allow an actuator stem of the fluid valve actuator to tilt or lean within the base to enable a lever of the fluid valve actuator to rotate and a guide receiving area adjacent the opening of the base. A guide is coupled to the guide receiving area and the guide has a bearing surface to slidably engage the actuator stem to limit lateral movement of a diaphragm assembly relative to a longitudinal axis of the opening to prevent the diaphragm assembly from engaging an inner surface of an actuator housing as the actuator stem moves between a first position and a second position.

In another example, a fluid valve actuator includes a diaphragm disposed within an actuator housing to define a pressure chamber and a spring chamber. An actuator stem is coupled to the diaphragm via a diaphragm plate at a first end of the actuator stem and is coupled to a lever at a second end of the actuator stem. An actuator stem guide apparatus is disposed within the actuator housing and has a bearing surface to slidably receive the actuator stem such that the bearing surface provides a lateral force to the actuator stem to limit a lateral movement of the diaphragm and the diaphragm plate relative to a longitudinal axis of the actuator housing to prevent the diaphragm plate and diaphragm from engaging an inner surface of the actuator housing during operation. A biasing element is disposed within the spring chamber such that the biasing element substantially surrounds the actuator stem guide apparatus.

DETAILED DESCRIPTION

In general, the example actuator stem guide apparatus described herein prevent a diaphragm assembly (e.g., a diaphragm and/or a diaphragm plate) of a fluid control valve from contacting or engaging an inner surface or side wall of an actuator housing to prevent degraded actuator performance and/or the diaphragm assembly from becoming damaged during operation. In particular, an example actuator stem guide apparatus may include a housing disposed within the actuator housing that includes an aperture or bearing surface to slidably receive and/or guide an actuator stem. In one example, at least a portion of the actuator stem guide housing and/or bearing surface is composed of a low friction material such as, for example, Delrin, Polytetrafluoroethylene (PTFE), Ultra High Molecular Weight Polyethylene (UHMWPE), etc., to reduce friction as the actuator stem slides relative to the actuator stem guide apparatus. In operation, the actuator stem guide apparatus provides a force to the actuator stem to guide and/or significantly limit translational movement of a diaphragm assembly relative to the actuator housing to prevent the diaphragm assembly from engaging the inner side wall of the actuator housing during a stroke of the actuator (e.g., a full stroke length of the actuator).

Figure 1A:
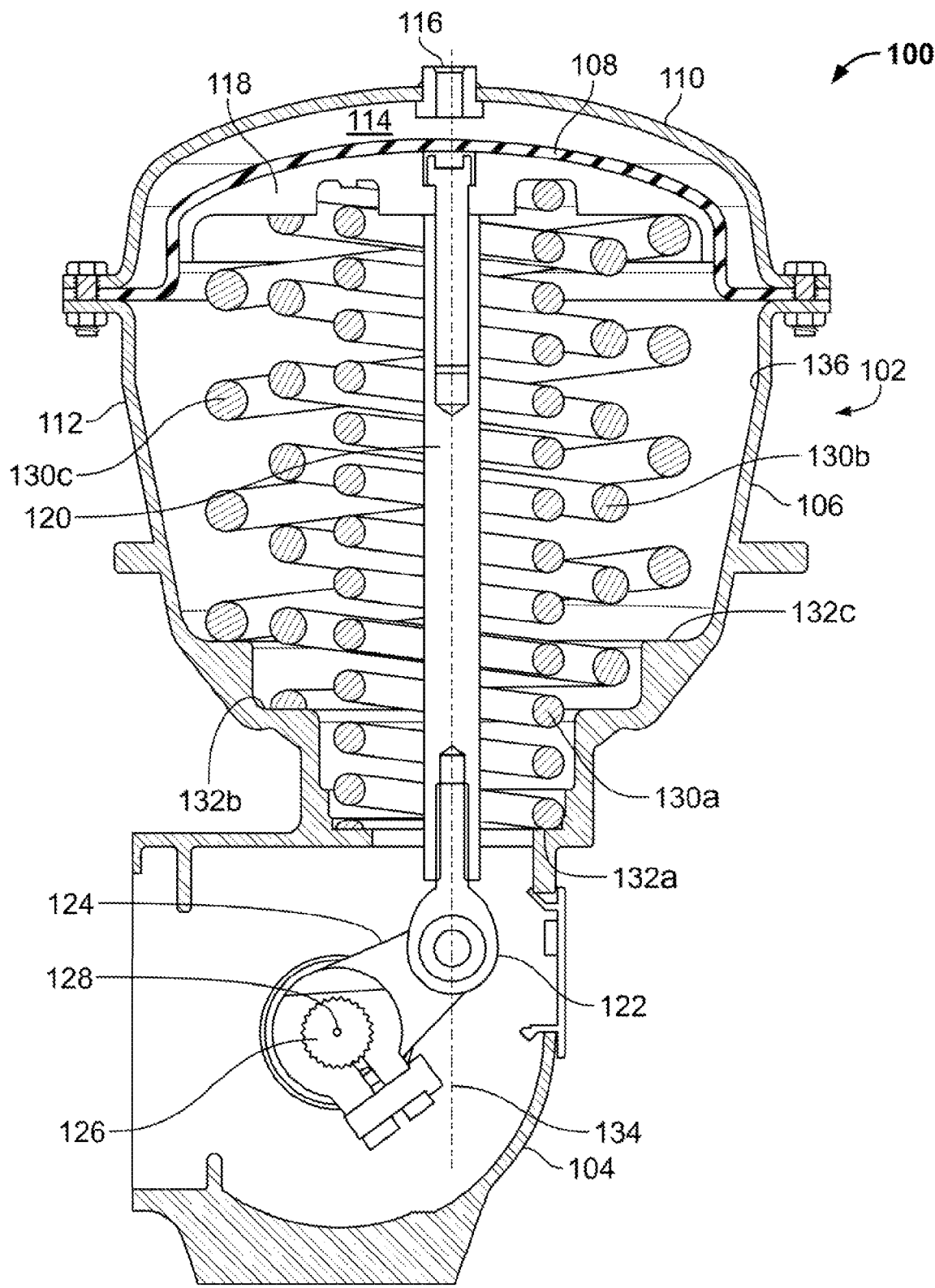
FIG. 1A illustrates a known fluid valve actuator shown with the springs in a preloaded compressed state.

FIG. 1A is a cross-sectional view of a known fluid valve actuator or actuator assembly 100 that may be used with, for example, a rotary fluid valve. Referring to FIG. 1A, the example fluid valve actuator 100 includes an actuator 102 coupled to a housing 104. The actuator 102 includes a casing or actuator housing 106 that captures a diaphragm 108 between an upper casing 110 and a lower casing 112. The diaphragm 108 separates the space within the actuator housing 106 into a control pressure chamber 114 that receives a controlled pressure via an inlet port 116 to displace the diaphragm 108. A diaphragm plate 118 couples the diaphragm 108 to an actuator stem or diaphragm rod 120 and provides a rigid backing for the diaphragm 108. A rod end bearing 122 couples the actuator stem 120 to a lever 124, which operatively couples the actuator stem 120 to a flow control member or throttling member (e.g., a ball, a disk, a plug, etc.) of the rotary fluid valve. The lever 124 receives a valve shaft 126 coupled to the flow control member of the rotary fluid valve. The lever 124 rotates the valve shaft 126 about an axis 128 to move the flow control member relative to a valve seat (not shown) of the rotary fluid valve to control the flow of process fluid through the rotary fluid valve.

Springs 130a-c surround the actuator stem 120 and are disposed between the diaphragm plate 118 and respective spring seats 132a-c, which are integrally formed with the lower casing 112. Each of the springs 130a-c provides a biasing force against the diaphragm plate 118 to return the actuator stem 120 and any suitable operator (e.g., a flow control member of a rotary valve) coupled to the actuator stem 120 to a known position in the absence of a control pressure applied to the diaphragm 108 via the control chamber 114.

Figure 1B:
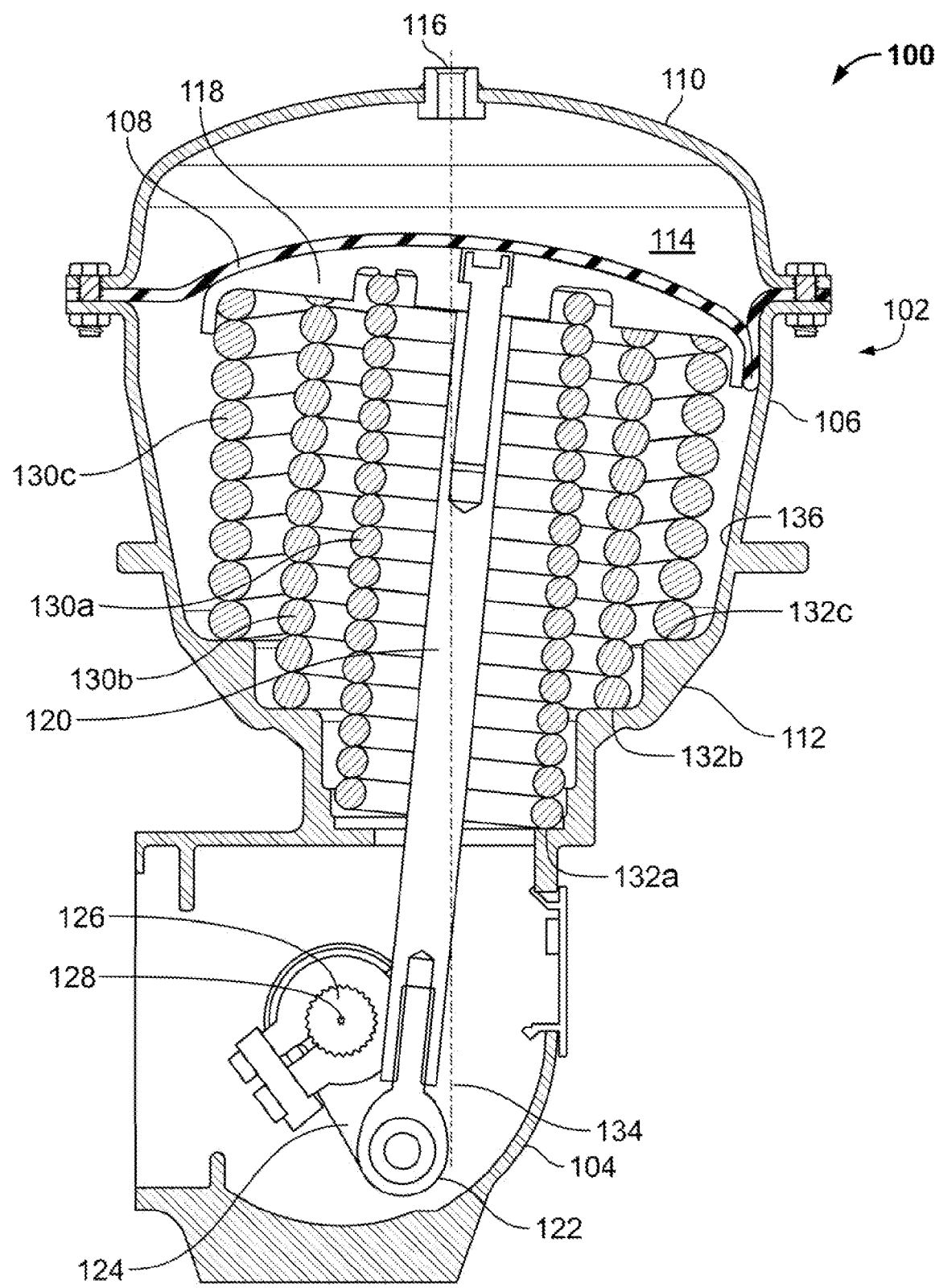
FIG. 1B illustrates the known actuator of FIG. 1A shown with the springs in a fully compressed state.

FIG. 1B illustrates the fluid valve actuator 100 of FIG. 1A with the springs 130a-c in a compressed state. Referring to FIGS. 1A and 1B, in operation, the fluid valve actuator 100 receives a control signal such as, for example, compressed air in the control pressure chamber 114 via the inlet port 116. The compressed air displaces the diaphragm 108 and the diaphragm plate 118 against the springs 130a-c. A displacement of the diaphragm 108 results in a corresponding rectilinear displacement of the actuator stem 120. The rectilinear displacement of the actuator stem 120 is converted into a rotational displacement of the lever 124, whereby rotation of the lever 124 causes the valve shaft 126 and a fluid control member coupled to the valve shaft 126 to rotate to a desired angular position relative to a valve seat to vary or control the fluid flowing through a rotary fluid valve. As the diaphragm plate 118 compresses the springs 130a-c, the actuator stem 120 moves away from the upper casing 110 causing the lever 124 to rotate to move the flow control member toward a valve seat. In the compressed state as shown in FIG. 1B, the actuator 102 may impart an output torque to a flow control member via the lever 124 so that the flow control member sealingly engages the valve seat to prevent fluid flow through the rotary fluid valve. If the output torque is insufficient, fluid may leak past the valve seat when the valve is in the closed position.

The connection between the rod end bearing 122 and the lever 124 enables or allows the actuator stem 120 and/or the diaphragm plate 118 to pivot or rotate about the rod end bearing 122, which can cause the actuator stem 120 and/or the diaphragm plate 118 to lean, tilt or translate relative to a longitudinal axis 134 of the actuator 102. Diaphragm plate tilt or lean may be caused by uneven loading or side loading imparted on the springs as the actuator stem 120 and/or diaphragm plate 118 tilts or leans toward the actuator housing 106. As a result, as the springs 130a-c compress or move through a stroke length (e.g., a complete stroke length), the springs 130a-c may move, deflect or bow.

Further, the springs 130a-c may have length to diameter ratio that inherently causes the springs 130a-c to buckle under load. In any event, if the springs 130a-c are unable to remain straight under load, the diaphragm plate 118 may move off center relative to the longitudinal axis 134, which can cause the diaphragm plate 118 to contact an inner surface 136 of the actuator housing 106. For example, diaphragm plate lean or tilt may cause the diaphragm plate 118 to contact the inner surface 136 of the actuator housing 106 when the actuator 102 is in the position shown in FIG. 1A, the position shown in FIG. 1B, and/or when the actuator 102 moves between the position shown in FIG. 1A and the position shown in FIG. 1B. Such contact creates friction and/or may cause the diaphragm plate 118 to crimp or deform the diaphragm convolution, which reduces the effective diaphragm area. A diaphragm plate that is damaged or a diaphragm that is damaged or has relatively less effective diaphragm area significantly reduces the performance of a fluid control valve because the net output torque to the lever 124 and, thus, the flow control member of the rotary valve is significantly reduced. In some instances, an insufficient output or sealing torque may prevent a flow control member from sealingly engaging a valve seat, thereby causing fluid leakage past the valve seat when the fluid valve is in a closed position.

Figure 2:
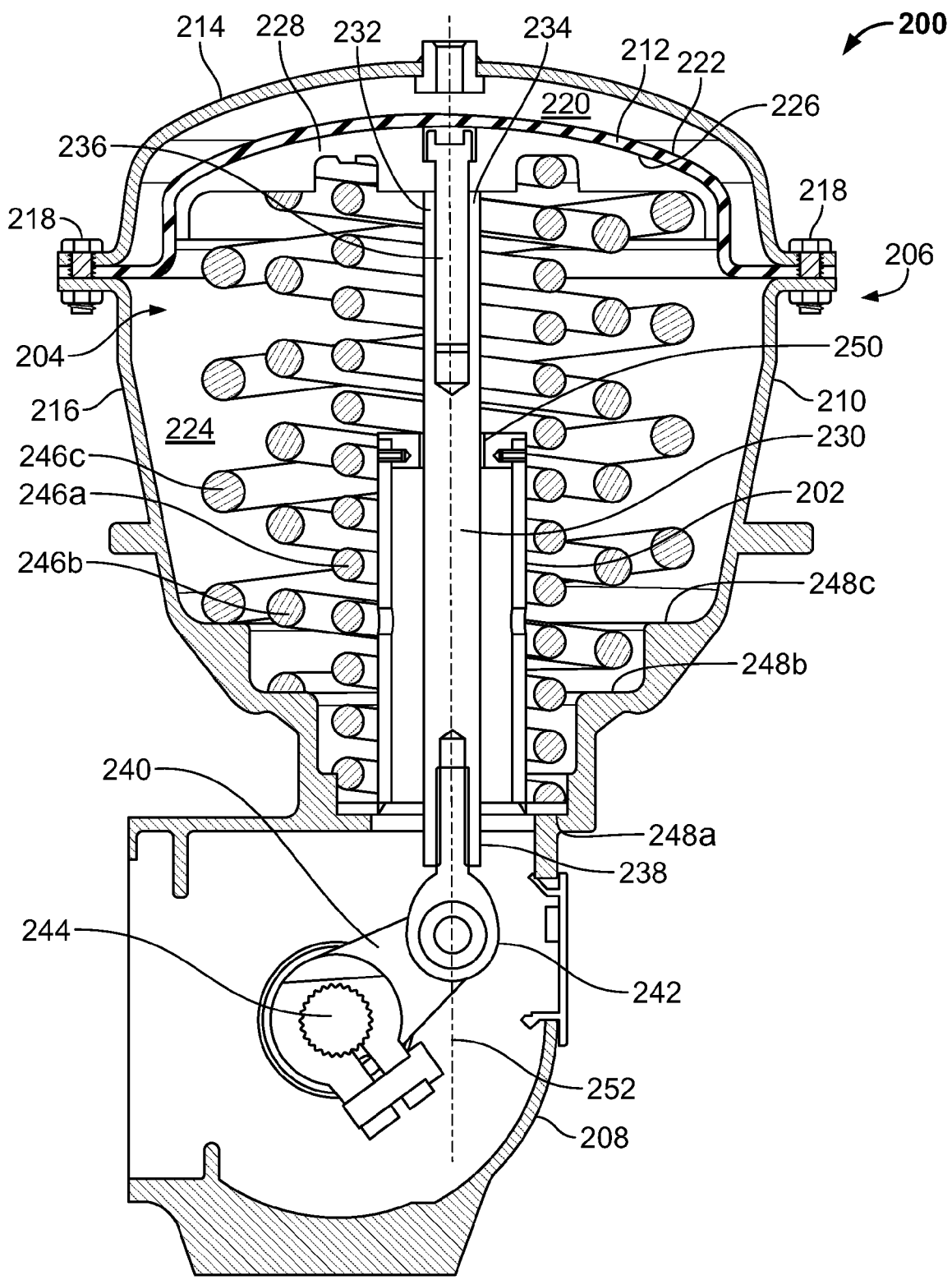
FIG. 2 illustrates an example fluid valve actuator implemented with an example actuator stem guide apparatus described herein.

FIG. 2 is a cross-sectional view of a fluid valve actuator or actuator assembly 200 that is implemented with an example actuator stem guide apparatus 202 described herein. FIG. 2 illustrates the actuator 200 in a first position or zero percent stroke length position 204 (e.g., an initial or preloaded compressed state of the biasing elements 246a-c). Referring to FIG. 2, the example fluid valve actuator 200 includes an actuator 206 coupled to a housing 208. The actuator 206 includes a housing 210 that captures a diaphragm 212 between an upper casing 214 and a lower casing 216. The upper and lower casings 214 and 216 are coupled together with a plurality of threaded fasteners 218 spaced along an outer edge of the actuator housing 210. The diaphragm 212 separates the space within the actuator housing 210 into a control pressure chamber 220 adjacent a first side 222 of the diaphragm 212 and a spring chamber 224 adjacent a second side 226 of the diaphragm 212. A diaphragm plate 228 couples the diaphragm 212 to an actuator stem or diaphragm rod 230 and provides a rigid backing for the diaphragm 212. The actuator stem 230 includes a first end 232 having an internally threaded bore 234 that receives a fastener 236 (e.g., a cap screw) to couple the diaphragm plate 228 to the actuator stem 230. A second end 238 of the actuator stem 230 is rotatably coupled to a lever 240 via a rod end bearing 242. The lever 240 operatively couples the actuator stem 230 to a valve shaft 244 of a rotary fluid valve (not shown) to operate a flow control member or throttling member (e.g., a ball, a disk, a plug, etc.) of the rotary fluid valve.

Biasing elements 246a-c (e.g., springs) are disposed within the spring chamber 224 between the diaphragm plate 228 and respective spring seats or seating surfaces 248a-c and surround the actuator stem 230 and the actuator stem guide apparatus 202. More specifically, the biasing element 246a surrounds the actuator stem guide apparatus 202 and the actuator stem guide apparatus 202 includes a first opening or bearing surface 250 to slidably receive the actuator stem 230 as the actuator 206 moves actuator stem 230 along a longitudinal axis 252 of the fluid valve actuator 200. When disposed within the actuator housing 210, the biasing elements 246a-c provide a preload to retain the actuator stem guide apparatus 202 within the actuator housing 210.

Figure 3:
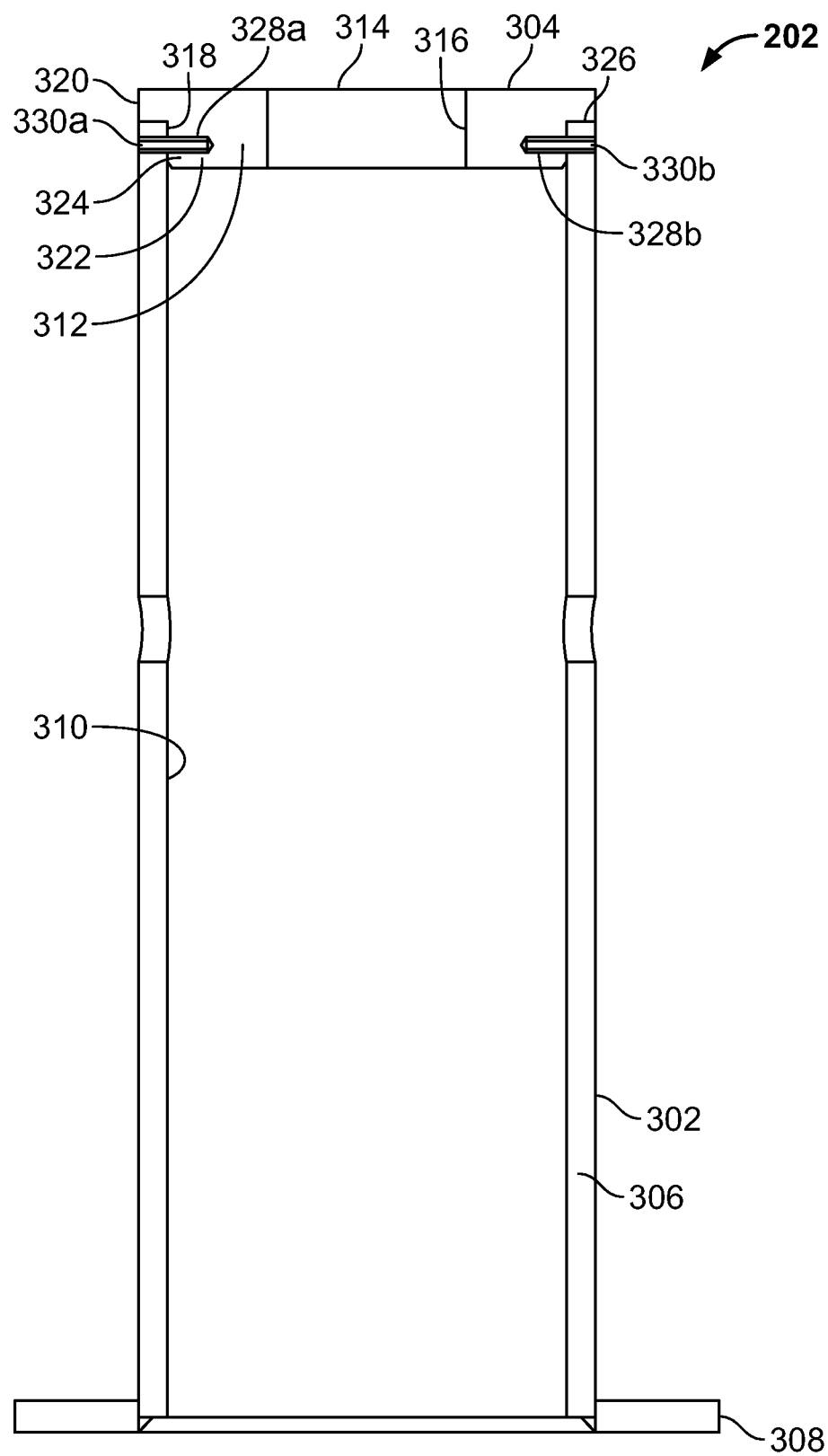
FIG. 3 illustrates an enlarged cross-sectional view of the example actuator stem guide apparatus of FIG. 2.

FIG. 3 illustrates the example actuator stem guide apparatus 202 of FIG. 2. Referring to FIGS. 2 and 3, the actuator stem guide apparatus 202 includes a base 302 composed of a first material and a guide 304 composed of a second material different than the first material. The base 302 is a tubular body 306 having a spring seat or flange 308 that engages the seating surface 248a of the actuator housing 210. The biasing element 246a engages or clamps the flange 308 between the biasing element 246a and the seating surface 248a, and the biasing element 246a substantially surrounds the base 302. The base 302 also includes an opening 310 that is dimensioned to enable the actuator stem 230 to tilt or lean within the base 302 during operation. The base 302 may have any suitable length or height such as, for example, a length that is at least greater than half of the length of the biasing element 246a, a length that is at least greater than one third of the length of the biasing element 246a, or any other suitable length. The base 302 may be composed of high-strength alloy steel (e.g., stainless steel), a plastic (e.g., a hard plastic) or any other suitable material and may be made via machining, molding or any other suitable process(es).

The guide 304 is a cap or a top portion 312 that removably couples to the base 302. The guide 304 includes an opening 314 to slidably engage or receive the actuator stem 230 to guide the actuator stem 230 relative to the longitudinal axis 252. In particular, the diameter of the opening 314 is slightly greater than the diameter of an outer surface of the actuator stem 230 to allow the actuator stem 230 to slide therethrough, but is smaller than the diameter of the opening 310 of base 302. In this example, the opening 314 includes a face or bearing surface 316 that is substantially parallel to the longitudinal axis 252 (e.g., a substantially straight opening). However, in other examples, as described below, the face 316 of the opening 314 may have a curved profile or cross-sectional shape or may have any other suitable shape or profile.

The guide 304 includes an annular recess 318 to define a flange 320 and a body 322 of the guide 304. When coupled to base 302, at least a portion 324 of the body 322 is disposed within the opening 310 of the base 302 and the flange 320 engages an upper edge or surface 326 of the base 302. The base 302 and the guide 304 include a plurality of apertures 328a-b to receive respective pins 330a-b (e.g., roll pins) to couple or fasten the guide 304 and the base 302. In other examples, the top portion 312 may be integrally formed with the body 302 as a unitary piece or structure. The guide 304 may be composed of a low friction material such as, for example, Delrin, Polytetrafluoroethylene (PTFE), Ultra High Molecular Weight Polyethylene (UHMWPE) and may be made via machining or any other suitable process(es). Thus, the guide 304 applies a force to the actuator stem 230 to guide the actuator stem 230 as the actuator slides or moves through the opening 314 with relatively low (e.g., negligible) friction.

Figure 4:
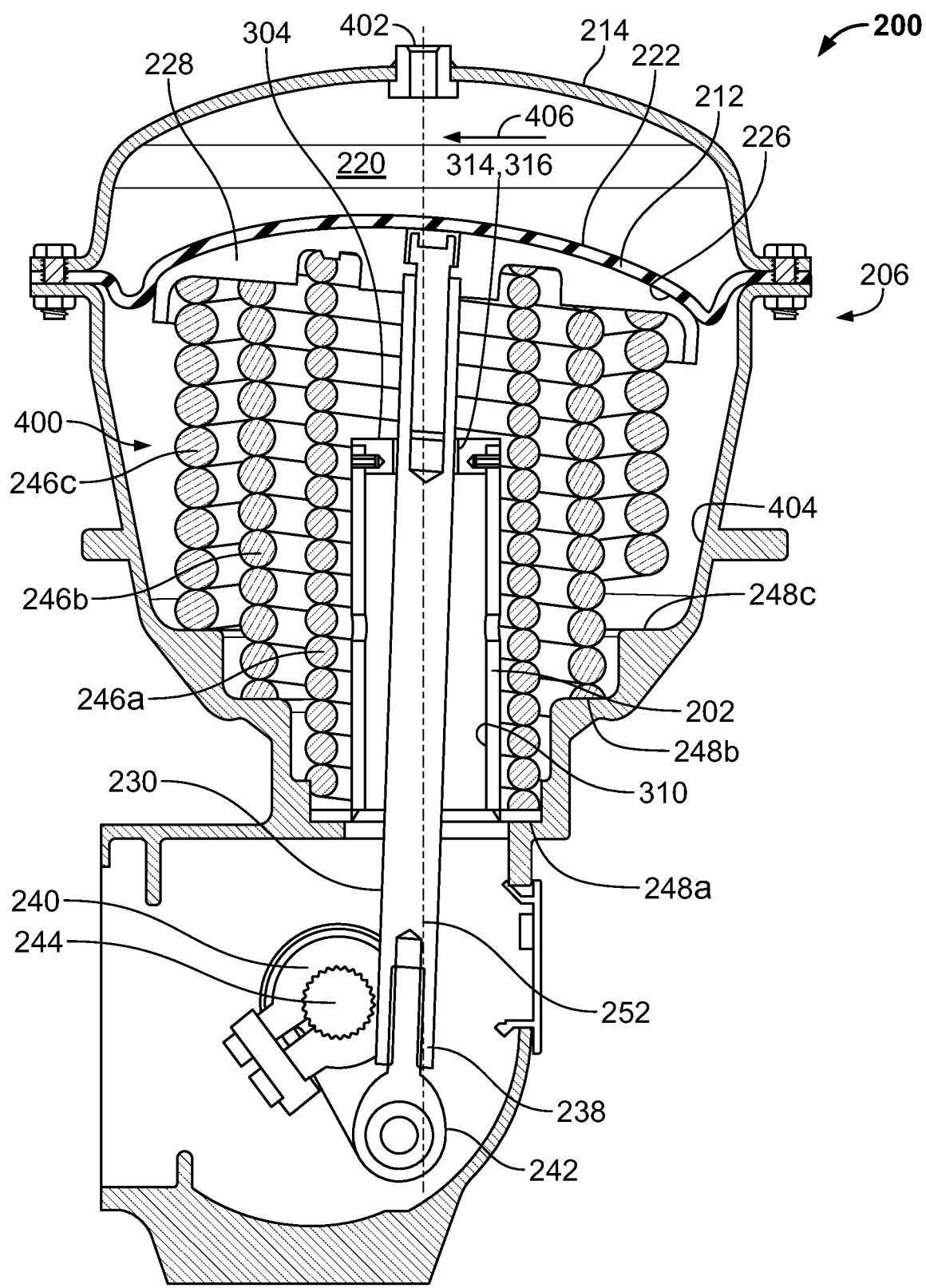
FIG. 4 illustrates the example fluid valve actuator of FIG. 3 shown with the springs in a compressed state.

FIG. 4 illustrates the example fluid valve actuator 200 of FIG. 2 in a second position or one-hundred percent stroke position 400 (e.g., a condition in which the biasing elements 246a-c are fully compressed). Referring to FIGS. 2-4, in operation, a control signal such as, for example, compressed air is supplied to the pressure chamber 220 via an inlet port 402 to displace the diaphragm 212. A pressure differential across the diaphragm 212 provided by the control air and the biasing elements 246a-c moves the diaphragm 212 along the longitudinal axis 252. Thus, in this example, a force exerted on the first side 222 of the diaphragm 212 that is greater than the force exerted by the biasing elements 246a-c on the second side 226 of the diaphragm 212 causes the diaphragm 212 to move away from the upper casing 214. The compressed air displaces the diaphragm 212 and the diaphragm plate 228 against the biasing elements 246a-c and the displacement of the diaphragm 212 results in a corresponding rectilinear displacement of the actuator stem 230. The rectilinear displacement of the actuator stem 230 is converted into a rotational displacement of the lever 240, which causes the valve shaft 244 and a fluid control member to rotate to a desired angular position relative to a valve seat (not shown) to vary or control the fluid flowing through a valve body (not shown) of a rotary fluid valve coupled to the actuator 206. For example, the actuator 206 may vary the position of the flow control member between a fully open or maximum flow rate position at which the flow control member is spaced or separated from the valve seat to allow fluid flow through the valve (e.g., zero percent stroke position 204 shown in FIG. 2) and a closed position at which the flow control member is in sealing engagement with a valve seat to prevent fluid flow through the valve (e.g., the one-hundred percent stroke position 400 shown in FIG. 4).

As the actuator moves between the position 204 of FIG. 2 and the position 400 of FIG. 4, the rod end bearing 242 allows the actuator stem 230 and, thus, the diaphragm plate 228 to pivot or rotate about the second end 238 as the actuator stem 230 causes the lever 240 to rotate. In turn, the diaphragm plate 228 and/or the actuator stem 230 can pivot or translate relative to the longitudinal axis 252. Such movement of the diaphragm plate 228 and/or the actuator stem 230 can cause the biasing elements 246a-c to be loaded unevenly causing the biasing elements 246a-c to move, deflect or translate within the actuator housing 210.

However, as shown in FIG. 4, the actuator stem guide apparatus 202 guides or slidably contacts the actuator stem 230 to substantially limit tilting or leaning of the diaphragm plate 228 relative to the longitudinal axis 252 as the actuator stem 230 moves between the positions 204 and 400. Thus, the actuator stem guide apparatus 202 constrains, limits or reduces the translational motion of the actuator stem 230 in a lateral direction relative to the longitudinal axis 252 to prevent the diaphragm plate 228 from engaging or contacting an inner surface 404 of the actuator housing 210. In other words, the guide 304 slidably engages or receives the actuator stem 230 as the actuator stem 230 moves between the position 204 of FIG. 2 and the position 400 of FIG. 4 and provides a substantially lateral force generally represented by arrow 406 that is substantially perpendicular to the longitudinal axis 252 to guide or substantially center the actuator stem 230 and/or the diaphragm plate 228 relative to the longitudinal axis 252. In particular, the bearing surface or face 316 of the opening 314 slidably engages the actuator stem 230 and imparts the lateral force 406 perpendicular to the longitudinal axis 252 limiting any tilting or leaning of the diaphragm plate 228 to prevent the diaphragm plate 228 from engaging or contacting the inner surface 404 of the actuator housing 210. Additionally, the opening 310 of the base 302 enables the actuator stem 230 to tilt or lean within the base 302 to rotate the lever 240. Thus, the actuator stem guide apparatus 202 allows the actuator stem 230 and the diaphragm plate 228 to tilt as the actuator stem 230 rotates the lever 240, but the actuator stem guide apparatus 202 limits the tilting motion of the diaphragm plate 228 and/or the actuator stem 230 to prevent the diaphragm plate 228 from engaging the inner surface 404 of the actuator housing 210.

When control fluid is removed or exhausted from the pressure chamber 220, each of the biasing elements 246a-c provides a biasing force against the diaphragm plate 228 to return the actuator stem 230 and any suitable operator (e.g., a flow control member of a rotary valve) coupled to the actuator stem 230 to a known position in the absence of a control pressure applied to the diaphragm 212 (e.g., the position 204 shown in FIG. 2). The actuator stem guide apparatus 202 guides the actuator stem 230 as the diaphragm 212 moves to the position 204 of FIG. 2.

Figure 5A:
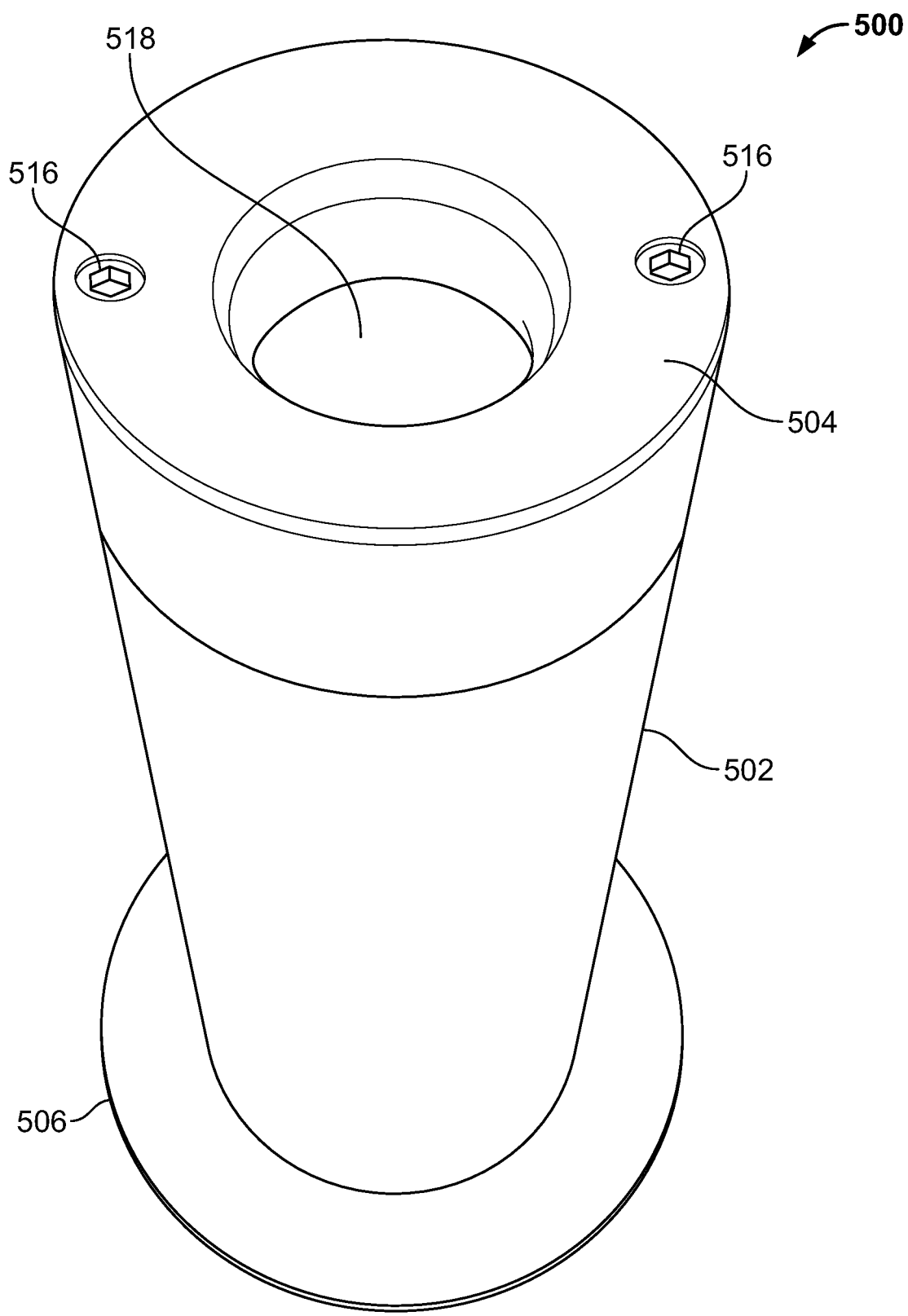
FIGS. 5A-5C and 6-8 illustrate other example actuator stem guide apparatus described herein.
Figure 5B:
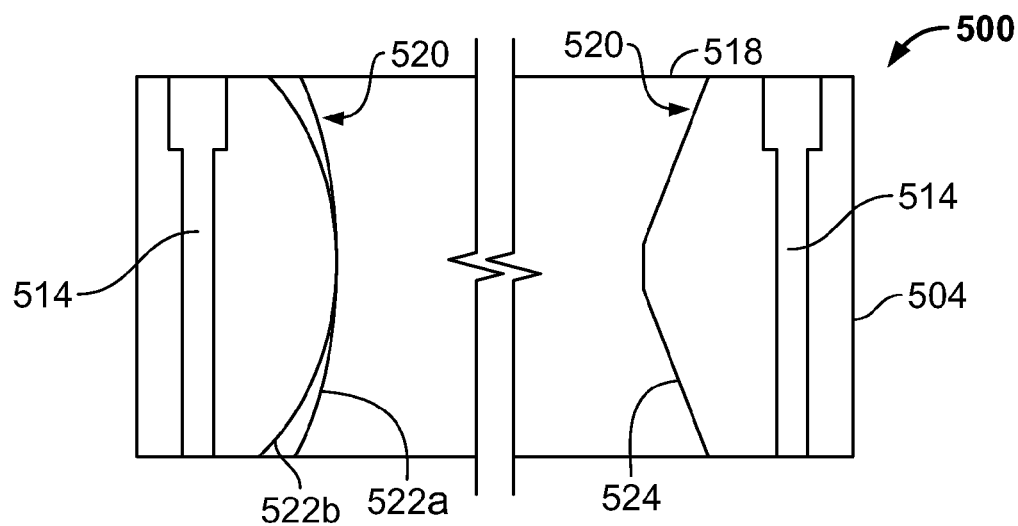
Figure 5C:
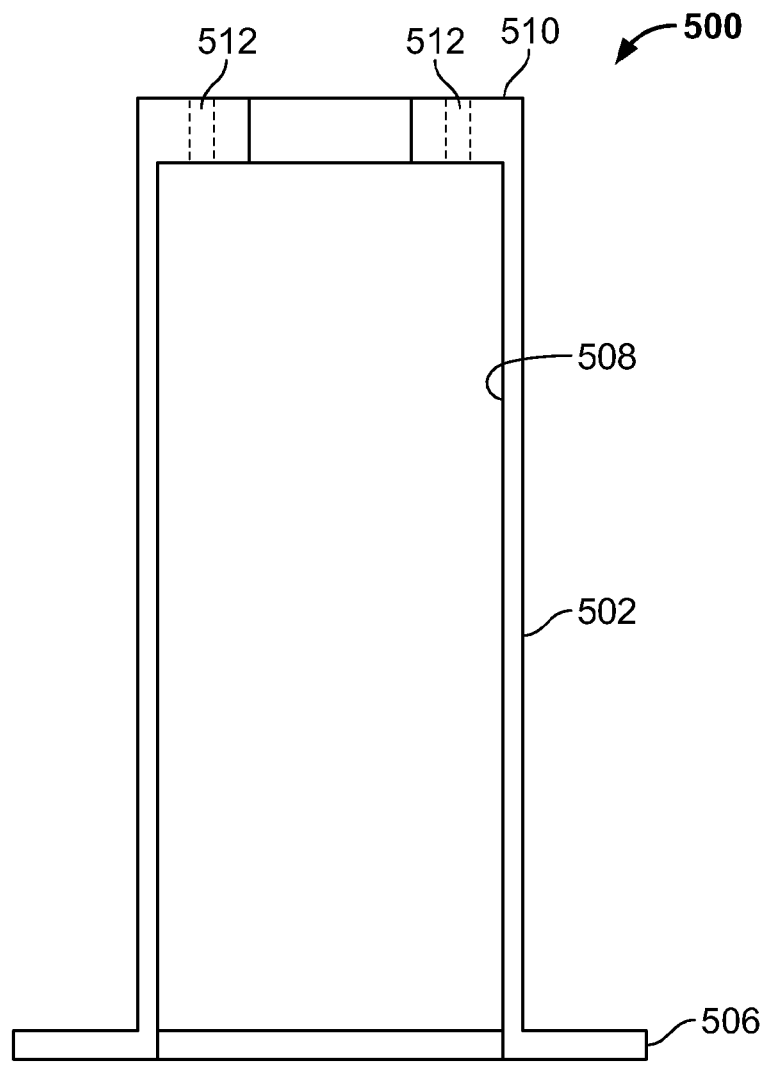

FIGS. 5A-5C illustrate another example actuator stem guide apparatus 500 described herein that may be used to implement the example fluid valve actuator 200 of FIGS. 2 and 4. The example actuator stem guide apparatus 500 includes a base 502 composed of a first material and a guide 504 composed of a second material different than the first material. The base 502 includes a projection, flange or spring seat 506 that engages a surface of an actuator housing (e.g., the seating surface 248*a* of FIGS. 2 and 4). The base 502 is a cylindrically shaped or tubular member having an opening 508 to slidably receive an actuator stem. As shown, an upper end 510 of the base 502 includes apertures 512. The base 502 may be composed of a metal (e.g., stainless steel), a hard plastic, or any other suitable materials to provide strength and stability to the guide 504.

The guide 504 includes apertures 514 that align with the respective apertures 512 at the upper end 510 of the base 502 to receive fasteners 516 that couple the guide 504 and the base 502. The guide 504 includes an opening 518 that slidably engages an actuator stem as the actuator stem moves between a first position and a second position (e.g., the first and second positions 204 and 400 of FIGS. 2 and 4). The opening 518 has a bearing surface or face 520 that may have a curved cross-sectional shape 522 having a first radius of curvature 522*a* or a second radius of curvature 522*b* as shown in the left hand portion of the guide 504 of FIG. 5B. Alternatively, the bearing surface or face 520 may have a chamfered opening 524 as shown in the right hand portion of FIG. 5B. Such cross-sectional shapes may be used to reduce friction between an actuator stem and the guide 504 during operation of an actuator. In yet other examples, the bearing surface or face 520 may have any other suitable cross-sectional shape that reduces friction between an actuator stem and the guide 504. The guide 504 may be composed of a low friction material such as, for example, Delrin, Polytetrafluoroethylene (PTFE), Ultra High Molecular Weight Polyethylene (UHMWPE) and may be made via machining or any other suitable process(es).

Figure 6:
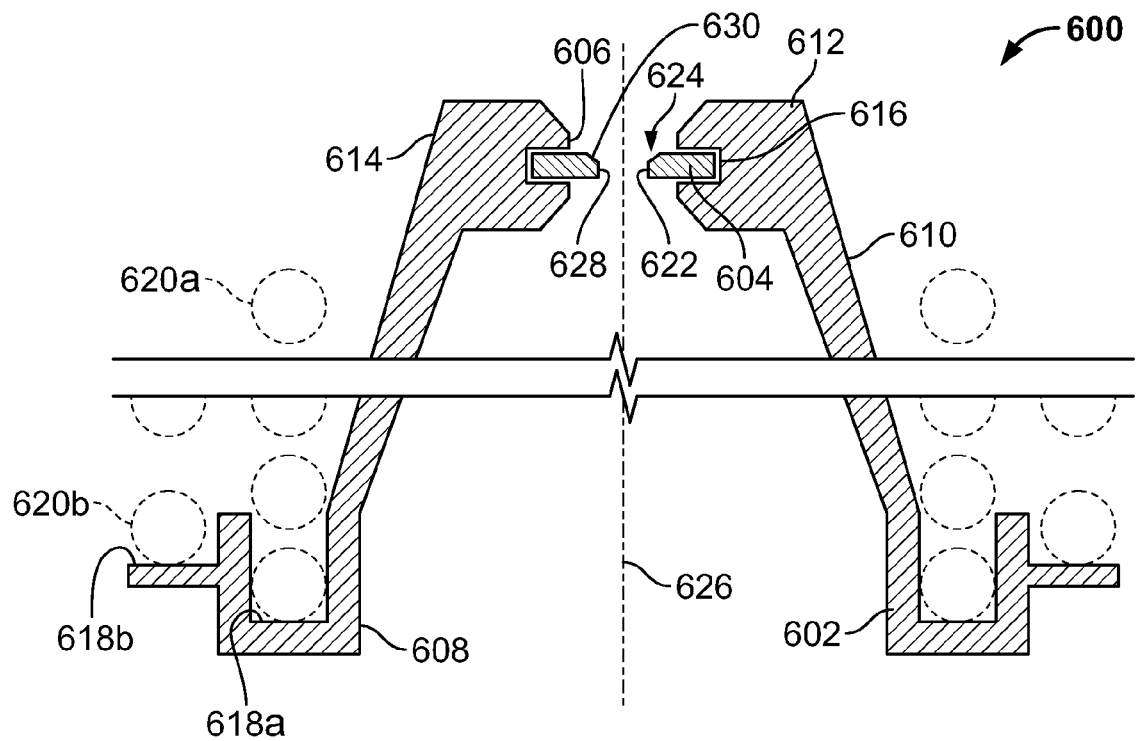

FIG. 6 illustrates another example actuator stem guide apparatus 600 described herein. The actuator stem guide apparatus 600 includes a base 602 composed of a first material and a guide ring 604 composed of a second material. In this example, the base 602 includes a first opening 606 and a second opening 608 in a tapered or cone shaped body 610. The second opening 608 has a diameter that is larger than the diameter of the first opening 606 to enable an actuator stem to tilt or lean within the base 602 during operation. The base 602 also includes a guide receiving portion 612 at an upper end 614 of the base 602 adjacent the first opening 606 that includes an annular groove or slot 616 to receive the guide ring 604. As shown, the base 602 includes seating surfaces 618*a* and 618*b* to receive biasing elements 620*a* and 620*b* (e.g., springs) of an actuator. In this example, the base 602 is a unitary structure that may be composed of steel, polyethylene or any other suitable material(s).

In this example, the guide ring 604 is composed of Polytetrafluoroethylene (PTFE) material. The guide ring 604 has an opening 622 that is to slidably receive an actuator stem (e.g., the diameter of the opening 622 is slightly larger than a diameter of outer surface of an actuator stem) when the actuator stem guide apparatus 600 is coupled to an actuator (e.g., the actuator 206 of FIGS. 2 and 4). The guide ring 604 includes a bearing surface or face 624 that is to slidably engage an actuator stem and impart a substantially lateral force to the actuator stem relative to an axis 626. As shown, the face 624 has a substantially straight portion 628 and a chamfered edge 630. However, in other examples, the face 624 may have any other suitable shape or profile. The guide ring 604 is coupled within the groove 616 via snap-fit or slip-fit. The diameter to thickness ratio of the guide ring 604 enables the guide ring 604 to deform when fitting the guide ring 604 within the groove 616 during assembly of the guide ring 604 and the base 602.

In operation, the guide ring 604 slidably engages or receives an actuator stem as the actuator stem moves between a first position and a second position and provides a substantially lateral force perpendicular to the axis 626 to guide or substantially align an actuator stem and/or a diaphragm plate relative to the axis 626. In particular, the face 624 slidably engages the actuator stem and imparts a lateral force perpendicular to the axis 626 to prevent a diaphragm plate from engaging or contacting an inner surface of an actuator housing. Additionally, the second opening 608 of the base 602 enables an actuator stem to tilt or lean within the base 602 as needed to enable a lever of an actuator to rotate.

Figure 7:
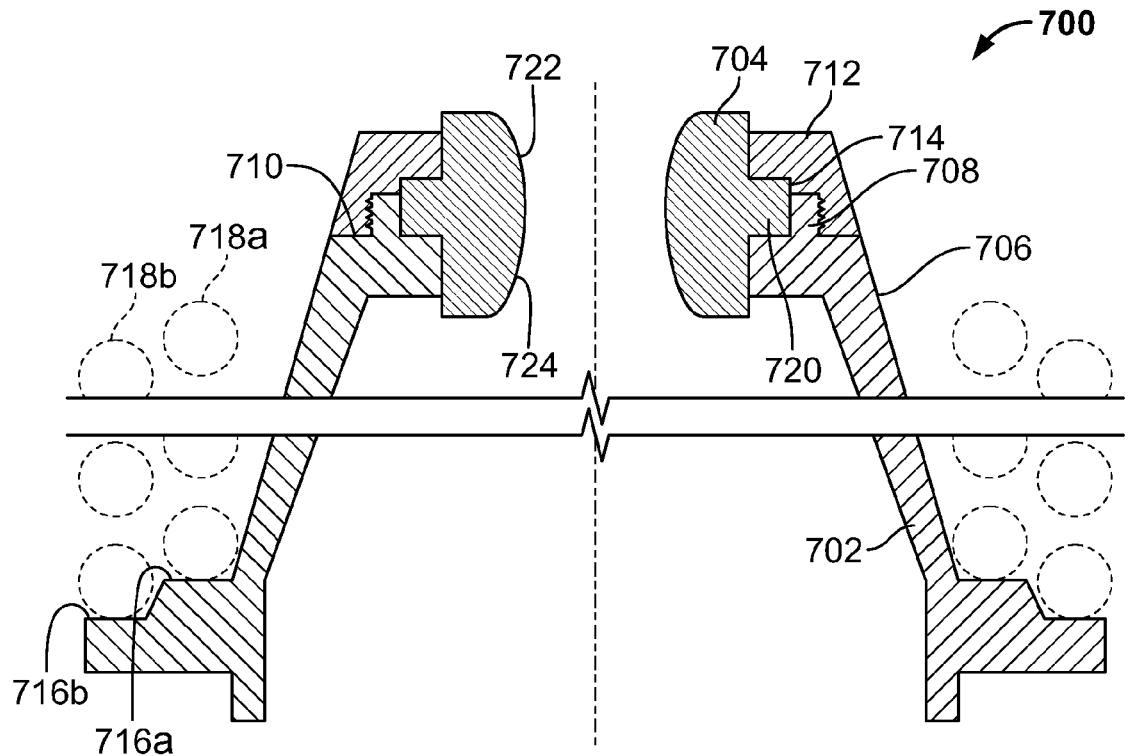

FIG. 7 illustrates another example actuator stem guide apparatus 700 described herein that can be used in applications that require a relatively large number of cycles and/or relatively large load applications. In this example, the actuator stem guide apparatus 700 includes a base 702 and a guide 704. The base 702 has an angled or tapered body 706. The base 702 also includes a threaded portion 708 protruding from an upper surface 710 of the base 702. The threaded portion 708 threadably receives a threaded cap or top 712 to contain or couple the guide 704 to the base 702. The cap 712 and the base 702 define or form a groove or guide receiving area 714 to receive the guide 704 when the cap 712 is coupled to the base 702. The base 702 also includes seating surfaces 716*a* and 716*b* to receive biasing elements 718*a* and 718*b*. The base 702 may be composed of steel (e.g., stainless steel), a hard plastic (e.g., UHMWPE), or any other suitable material.

In this example, the guide 704 has a lip or retaining portion 720 and an opening 722 defining an actuator stem engaging surface, bearing surface or face 724 to slidably receive an actuator stem. The lip 720 is disposed within the groove 714 and is captured between the cap 712 and the upper surface 710 of the base 702 when the cap 712 is coupled to the base 702. As shown, the face 724 includes a curved profile. However, in other examples, the face 724 may include a tapered profile, a substantially straight profile, or any other suitable profile. The guide 704 is composed of, for example, a ceramic material, a metal with high hardness characteristics, or any other materials having high hardness characteristics and/or relatively high resistance to wear. In some examples, a lubricant material may be provided to an actuator stem and/or the guide 704 to further reduce friction as an actuator stem slidably engages the face 724 of the guide 704.

Figure 8:
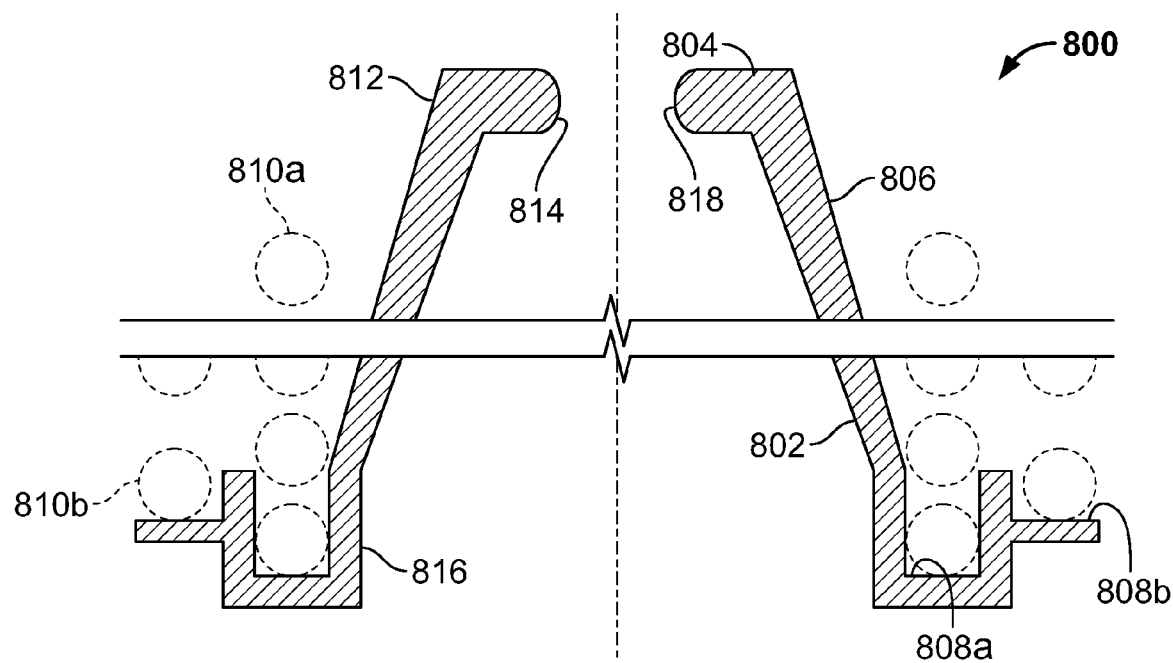

FIG. 8 illustrates yet another example actuator stem guide apparatus 800 described herein that may be used, for example, in applications involving a relatively large number of cycles and good longevity or wear properties. For example, an example actuator stem guide apparatus 800 may be composed of metal (e.g., stainless steel) an alloy, or other high strength materials having high strength properties. As shown, the actuator stem guide apparatus 800 includes a base 802 and a guide 804 integrally formed as a unitary piece of structure. As shown, the base 802 has a body 806 having a cone or tapered shaped profile. In other examples, the base 802 may be tubular or have any other suitable shape or structure. The base 802 may also include seating surfaces 808*a* and 808*b* to receive biasing elements 810*a* and 810*b*.

The guide 804 is at upper end 812 of the body 806 and includes a first opening 814 having a diameter that is smaller than a diameter of a second opening 816 of the base 802. The diameter of the guide 804 is larger than a diameter of an outer surface of an actuator stem and the guide 804 is to slidably receive an actuator stem. The second opening 816 enables an actuator stem to tilt or lean within the base 802 to enable a lever of an actuator to rotate. As shown, the first opening 814 defines a bearing surface or face 818 that is to slidably engage an actuator stem. The face 818 may include a beveled or rounded surface to reduce friction between the opening 814 (e.g., composed of metal) and an actuator stem (e.g., composed of metal). Additionally, a lubricating agent may be provided on an actuator stem or the face 818 of the guide 804 to further reduce friction during operation.

Figure 9:
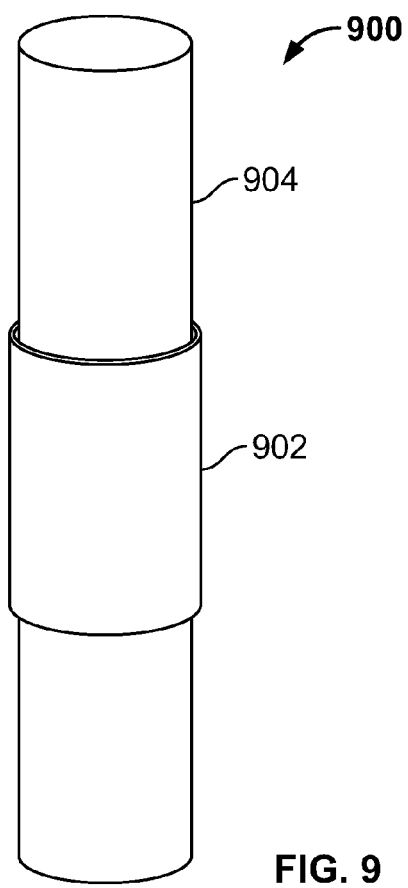
FIG. 9 illustrates an example actuator stem described herein that can be used to implement the example actuator stem guide apparatus described herein.

FIG. 9 illustrates an example actuator stem 900 that may be used to implement the example guide apparatus described herein. In contrast to the guide apparatus 202, 500, 600, 700, 800, the actuator stem 900 is implemented with relatively low friction material or sleeve 902 disposed along or coupled to an outer surface 904 of the actuator stem 900. For example, the actuator stem 900 may be used with the actuator stem guide apparatus 800 illustrated in FIG. 8. In yet another example, the actuator stem 900 may be used with the actuator stem guide apparatus 600 of FIG. 6. In that example, the guide ring 604 may be removed from the base 602.

The sleeve 902 is composed of a low friction material such as, for example, Delrin, UHMWPE, etc. In operation, the sleeve 902 engages a first opening (e.g., the opening 606 of FIG. 6 or the opening 814 of FIG. 8) or a face (e.g., the face 818 of FIG. 8) of a base or actuator stem guide apparatus as the actuator stem 900 moves between a first position and a second position during operation. The sleeve 902 reduces friction between the actuator stem 900 and a actuator stem guide apparatus as the actuator stem 900 moves within an actuator housing. Alternatively, in some examples, instead of the sleeve 902, the actuator stem 900 may include a plurality of strips or bands disposed in grooves along the outer surface 904 of the actuator stem 900 that are to engage an actuator stem guide apparatus.

The example actuator stem guide apparatus described herein may be factory installed and/or may be retrofit to existing valves in the field. For example, an actuator stem guide apparatus described herein may be retrofit to an existing actuator such as, for example, the fluid valve actuator 100 of FIG. 1A.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An actuator stem guide apparatus for use with a fluid valve actuator comprising:
    a base to be positioned inside a casing of the fluid valve actuator and to extend at least partially within a first opening defined by a biasing element positioned inside the casing, the base having a second opening to allow an actuator stem of the fluid valve actuator to tilt or lean within the base to enable a lever of the fluid valve actuator to rotate, an end of the base defining a guide receiving area adjacent the second opening of the base; and
    a first guide removably coupled to the guide receiving area of the base via a fastener that is received by the first guide and the guide receiving area, the guide being suspended adjacent the guide receiving area when the guide is coupled to the guide receiving area, the first guide having a first bearing surface defining a first profile to slidably engage the actuator stem to limit lateral movement of the diaphragm assembly relative to a longitudinal axis of the second opening to prevent the diaphragm assembly from engaging an inner surface of an actuator housing as the actuator stem moves between a first position and a second position, the first guide to be decoupled from the guide receiving area, and a second guide having a second bearing surface defining a second profile different than the first profile that is removably coupled to the guide receiving area when the first guide is decoupled from the guide receiving area.

2. A stem guide apparatus as defined in claim 1, wherein the second opening has a diameter that is larger than a diameter of the bearing surface.

3. A stem guide apparatus as defined in claim 1, wherein the first guide comprises a cap having a body and a flange, wherein at least a portion of the body of the cap is received within the second opening of the base such that the body of the cap engages an inner surface of the base and the flange of the cap is to engage an upper surface of the base when the first guide is coupled to the base.

4. A stem guide apparatus as defined in claim 3, wherein the guide receiving area includes at least one aperture having an axis that is perpendicular to the longitudinal axis of the second opening, and wherein the at least one aperture is adjacent the upper surface of the base.

5. A stem guide apparatus as defined in claim 4, wherein the body of the cap includes at least one aperture that aligns with the at least one aperture of the base to receive the fastener to couple the first guide and the base.

6. A stem guide apparatus as defined in claim 3, wherein the upper surface of the base includes at least one aperture having an axis that is parallel to the longitudinal axis of the second opening.

7. A stem guide apparatus as defined in claim 6, wherein the flange includes at least one aperture that aligns with the at least one aperture of the base to receive the fastener to couple the first guide and the base.

8. An actuator stem guide apparatus of claim 3, wherein the first guide is integrally formed with the cap.

9. A stem guide apparatus as defined in claim 1, wherein the base is composed of a first material and the first guide is composed of a second material different than the first material.

10. A stem guide apparatus as defined in claim 9, wherein the first material comprises a metal and the second material comprises a plastic.

11. A stem guide apparatus as defined in claim 1, wherein the base includes a seating surface or flange.

12. A stem guide apparatus as defined in claim 1, wherein the first bearing surface of the first guide has a curved cross-sectional shape.

13. An actuator stem guide apparatus of claim 1, wherein the first guide is dimensioned to provide a gap between the bearing surface and an outer surface of the actuator stem to enable the actuator stem to tilt or lean within the base during operation.

14. An actuator stem guide apparatus of claim 1, wherein the first guide has an outer diameter that is uniform with an outer diameter of the base, the first guide and the base defining a cylindrical body when the first guide is coupled to the base.

15. An actuator stem guide apparatus of claim 14, wherein the cylindrical body has a substantially uniform diameter along a length of the cylindrical body.

16. A fluid valve actuator comprising:
    a diaphragm disposed within an actuator housing to define a pressure chamber and a spring chamber;
    an actuator stem coupled to the diaphragm via a diaphragm plate at a first end of the actuator stem and coupled to a lever at a second end of the actuator stem;
    an actuator stem guide having a base and a first guide removably coupled to an end of the base, the first guide and the base being positioned inside the actuator housing, the base having a cylindrical body, the end of the base being disengaged from the actuator stem and a surface of the actuator housing, the first guide having a first bearing surface that defines a first profile and is to slidably receive the actuator stem, the first bearing surface to provide a lateral force to the actuator stem to limit a lateral movement of the diaphragm and the diaphragm plate relative to a longitudinal axis of the actuator housing to prevent the diaphragm plate and diaphragm from engaging an inner surface of the actuator housing during operation, the first guide to enable the actuator stem to tilt or lean within the base during operation; and a second guide having a second bearing surface that defines a second profile different than the first profile of the first guide, the second guide to removably couple to the end of the base when the first guide is decoupled from the end of the base.

17. A fluid valve actuator as defined in claim 16, wherein the base of the actuator stem guide is composed of metal and the first guide is composed of plastic.

18. A fluid valve actuator as defined in claim 16, wherein the end of the base comprises an annular groove to receive the first guide.

19. A fluid valve actuator as defined in claim 18, wherein the first guide comprises an elastomeric ring disposed in the annular groove.

20. A fluid valve actuator as defined in claim 16, wherein the end of the base comprises a protruding threaded portion adjacent an upper surface of the base.

21. A fluid valve actuator as defined in claim 20, wherein the protruding threaded portion of the base receives a threaded portion of the first guide to removably couple the first guide and the base.

22. A fluid valve actuator as defined in claim 20, wherein the first guide comprises a ring composed of a ceramic material.

23. A fluid valve actuator of claim 16, further comprising a biasing element disposed within the spring chamber, the biasing element surrounding at least a first portion of the base of the actuator stem guide and engaging at least a second portion of the base.

24. An actuator stem guide apparatus for use with a fluid valve actuator comprising:

first means for guiding an actuator stem to limit lateral movement of a diaphragm assembly relative to a longitudinal axis of an actuator housing to prevent the diaphragm assembly from engaging an inner surface of the actuator housing during operation, the first means for guiding defining a first profile;

means for receiving the first means for guiding within the actuator housing, the means for receiving including an end disengaged from the actuator stem and a surface of the actuator housing, the first means for guiding to enable the actuator stem to tilt or lean in the means for receiving to enable a lever to rotate, the means for receiving and the first means for guiding to be positioned inside the actuator housing; and means for coupling to removably couple the means for guiding to the end of the means for receiving, the first means for guiding to be decoupled from the means for receiving to enable second means for guiding defining a second profile different than the first profile to be removably coupled to the means for receiving.

25. An actuator stem guide apparatus of claim 24, further comprising means for reducing friction between the first means for guiding and the actuator stem as the actuator stem moves through a stroke length.

26. An actuator stem guide apparatus of claim 24, wherein the means for receiving and the first means for guiding are to extend at least partially in an opening defined by means for biasing positioned inside the actuator housing.

27. An actuator stem guide apparatus of claim 24, wherein the means for coupling comprises means for threadably coupling the first means for guiding and the means for receiving.

28. An actuator stem guide apparatus of claim 24, wherein the means for coupling comprises means for fastening to be received by the means for guiding and the first means for receiving.

* * * * *